(No Model.)
F. M. STEVENS.
THILL COUPLING.
No. 296,794. Patented Apr. 15, 1884.
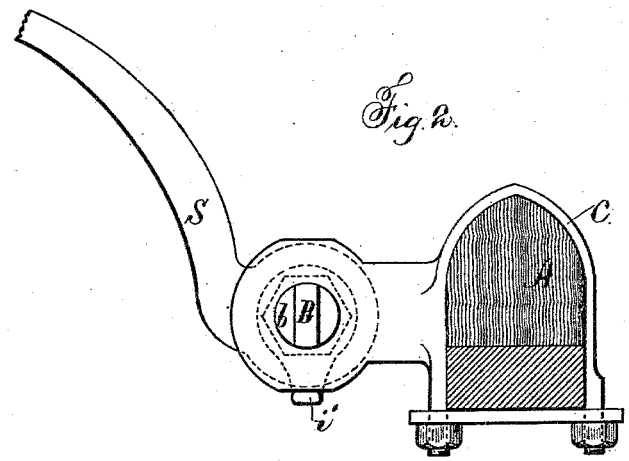
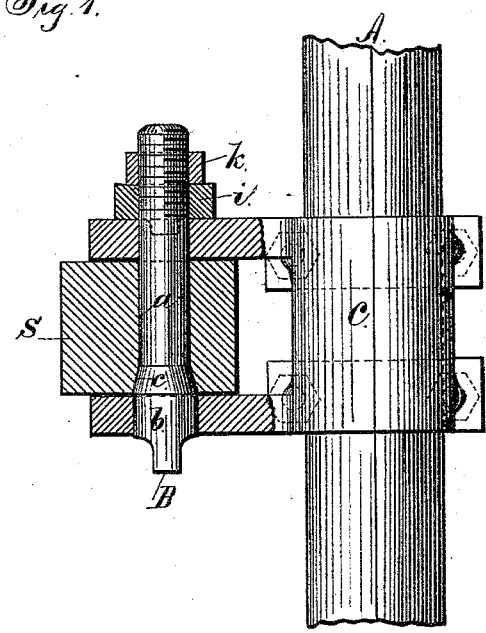
Witnesses
Harold Serrell
Chas H. Smith
Inventor
Frederick M. Stevens
per Lemuel W. Serrell
Atty

UNITED STATES PATENT OFFICE.

FREDERICK M. STEVENS, OF WATERBURY, CONNECTICUT.

THILL-COUPLING.

SPECIFICATION forming part of Letters Patent No. 296,794, dated April 15, 1884.

Application filed June 4, 1883. (No model.)

*To all whom it may concern:*

Be it known that I, FREDERICK M. STEVENS, of Waterbury, in the State of Connecticut, have invented an Improvement in Carriage-Shaft Bolts, of which the following is a specification.

The object of this invention is to prevent the rattling and looseness of the bolt that secures the eye of the carriage-shaft to the axle-clip without the use of india-rubber blocks or springs. I make use of a bolt having a tapering shoulder that fits into the shaft-eye in such a manner that it can be drawn up tightly by the nuts of the bolt, and will fill the conical part of the eye and prevent any rattling noise when the vehicle is in use.

In the drawings, Figure 1 is a section of the clip-shaft eye and bolt, and Fig. 2 is an elevation endwise of the bolt.

The axle A and clip C upon the same, and the eye at the end of the carriage-shaft S, are of ordinary character, except that the hole in the shaft-eye is adapted to receive the bolt B, which bolt is made with a conical shoulder, $c$, between the smaller shank portion $a$ of the bolt and the larger part $b$. This conical shoulder comes within the eye S of the shaft, so as to take a bearing upon the similarly-shaped interior of such shaft-eye. The shank of the bolt is made with a screw-thread toward one end, and the other end of the bolt is flattened on two sides to receive a screw-wrench, by which the bolt is revolved as it is screwed into the lock-nut $i$, which nut has a lip or finger, $i'$, that projects over one edge of the clip, so that it cannot turn. After the bolt is screwed properly into place, the jam-nut $k$ is screwed on to prevent the bolt from revolving. By this construction the bolt is held firmly, so that it will not turn in the jaws of the clip; but the shaft-eye can turn upon the said bolt more or less, and the taper of the bolt within the shaft-eye is set up from time to time to prevent looseness of the eye S upon the bolt, and thus avoid noise or rattling.

I am aware that a bolt for carriage-shafts has been made with a conical shoulder between the larger and smaller parts. In this case, however, the nut had a conical end passing into a conical recess around the eye of the shaft-iron. This device is complicated and expensive. In my improvement the shaft-iron is pressed toward one eye of the clip, and the nut is provided with a projection or finger that prevents the same turning while the bolt is being screwed up, thus simplifying the construction and increasing the facility for adjusting the parts.

I claim as my invention—

The combination, with the eye and axle-clip, of a screw-bolt having a tapering shoulder between the shank and the portion of larger diameter, flattened sides for a wrench, a nut having a projection or finger to prevent its turning when the bolt is being rotated, and a lock-nut, substantially as set forth.

Signed by me this 29th day of May, A. D. 1883.

FREDERICK M. STEVENS.

Witnesses:
  EDW. F. MERRIMAN,
  H. F. CAMP.